United States Patent
Horanzy et al.

(10) Patent No.: US 7,032,106 B2
(45) Date of Patent: Apr. 18, 2006

(54) METHOD AND APPARATUS FOR BOOTING A MICROPROCESSOR

(75) Inventors: Joseph Horanzy, Bensalem, PA (US); Akshay Mathur, Maple Shade, NJ (US)

(73) Assignee: Computer Network Technology Corporation, Minneapolis, MN (US)

( * ) Notice: Subject to any disclaimer, the term of this patent is extended or adjusted under 35 U.S.C. 154(b) by 595 days.

(21) Appl. No.: 10/026,707

(22) Filed: Dec. 27, 2001

(65) Prior Publication Data
US 2003/0126424 A1 Jul. 3, 2003

(51) Int. Cl.
G06F 9/445 (2006.01)
G06F 9/24 (2006.01)

(52) U.S. Cl. ............................................. 713/2; 713/1
(58) Field of Classification Search .................. 713/2, 713/1
See application file for complete search history.

(56) References Cited

U.S. PATENT DOCUMENTS

| | | | |
|---|---|---|---|
| 4,943,911 A | | 7/1990 | Kopp et al. |
| 5,546,355 A | * | 8/1996 | Raatz et al. ................. 365/233 |
| 5,572,468 A | * | 11/1996 | Ishinabe et al. ........ 365/189.05 |
| 5,754,863 A | * | 5/1998 | Reuter ......................... 717/173 |
| 5,898,869 A | * | 4/1999 | Anderson ....................... 713/2 |
| 6,216,224 B1 | * | 4/2001 | Klein ............................. 713/1 |
| 6,400,717 B1 | * | 6/2002 | Von Ahnen et al. .... 370/395.63 |

FOREIGN PATENT DOCUMENTS

| | | |
|---|---|---|
| EP | 0335812 A | 10/1989 |
| EP | 0524719 A | 1/1993 |
| EP | 0602791 A | 6/1994 |
| WO | WO 01 52062 A | 7/2001 |

* cited by examiner

Primary Examiner—Lynne H. Browne
Assistant Examiner—Stefan Stoynov
(74) Attorney, Agent, or Firm—Beck & Tysver, P.L.L.C.

(57) ABSTRACT

A method and system for bootstrapping a processor from a volatile memory device connected to the processor is disclosed. The first processor is bootstrapped from flash device. The reset lines of the second processor are asserted. The boot code for the second processor is loaded from the flash device into the volatile memory device. The reset lines of the second processor are de-asserted, wherein the processor then boots from the boot code stored in the volatile memory device. The same boot-strapping method can be extended to multi-drop systems where number of secondary processor can be more than one. A switchable means for the second processor to boot from volatile memory as described or from flash memory. A method also describes a mechanism to boot from synchronous volatile memory devices.

40 Claims, 4 Drawing Sheets

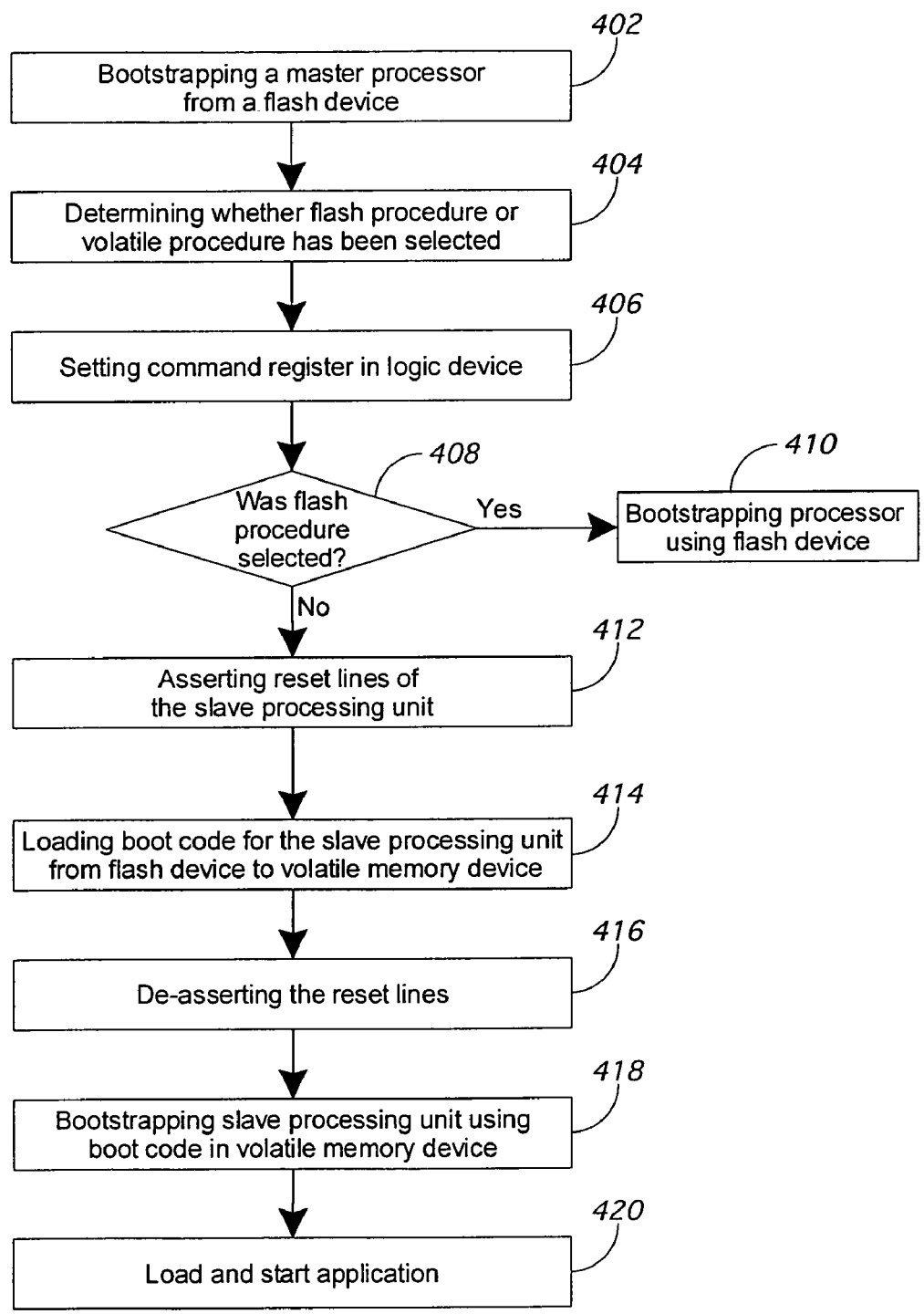

METHOD AND APPARATUS FOR BOOTING A MICROPROCESSOR

FIELD OF THE INVENTION

The present invention relates generally to boot-up procedures for a processor. More particularly, the present invention relates to booting-up a processor from a volatile memory device.

BACKGROUND OF THE INVENTION

Computers and computer-based devices such as personal computers (PCs), personal digital assistants (PDAs) and other embedded devices currently employ large, often complex, operating systems to execute user programs and process data. Conventional operating systems typically range in size from hundreds of kilobytes for small PDAs to hundreds of megabytes for high-end servers and PCs. To initialize or reset a computer or processor, a boot process is performed using system software and/or firmware.

Firmware refers to processor routines that are stored in non-volatile structures such as read only memories (ROMs), flash memories, and the like. These memory structures preserve the code stored in them, even when power is turned off. One of the principle uses of firmware is to provide routines that control a computer system when it is powered up from a shut down state, before volatile memory structures have been tested and configured. The process by which a computer is brought to its operating state from a powered down or powered off state is referred to as bootstrapping. Firmware routines may also be used to reinitialize or reconfigure the computer system following various hardware events and to handle certain platform level events like system interrupts.

The bootstrapping process typically begins with a processor(s) in a computer system and proceeds outward to system level resources. Initially, each processor tests its internal components and interfaces. In multi-processor systems, a single bootstrap processor is usually selected to handle initialization procedures for the system as a whole. These procedures include checking the integrity of memory, identifying and initializing other resources in the computer system, loading the operating system into memory, and initializing the remaining processors. Since volatile memory structures such as caches and random access memory (RAM) are not dependable until later in the boot process, the processor implements some of its early firmware routines for the various bootstrapping procedures inside nonvolatile memory such as flash devices. One advantage of using flash devices is that they can be quickly reprogrammed without being removed form the system. The flash memory, by virtue of its electrical programmability and erasability, is easily updated under system software control while being physically connected to the computer motherboard.

Typically, many processors in a computer system may have their own flash devices for storing, amongst other things, bootstrapping procedures. One problem with these systems is the cost and board space needed to provide all of these flash devices including their support hardware and sockets. Another problem may occur if the bootstrapping procedure needs to be changed. If the bootstrapping procedure is changed, a user must make sure that the procedure has been changed in all of the flash devices, or else the system may not initializes correctly.

Accordingly, it is desirable to provide a method and apparatus for bootstrapping a plurality of processors from a single flash device so as to save costs and board space while ensuring the ease of updating changes to the bootstrapping procedure.

SUMMARY OF THE INVENTION

In one aspect of the present invention a method and apparatus is provided for allowing a processor to boot from a volatile memory device, thus eliminating the need for some flash devices in a computer system.

In another aspect of the present invention a method and apparatus is provided for allowing a user to select between booting a processor from a flash device or a volatile memory device when both options are available.

In yet another aspect of the invention a novel method and apparatus for tricking the processor to boot from a volatile memory device is disclosed. In accordance with one embodiment of the present invention, a method and system for bootstrapping a processor from a volatile memory device associated with the processor is disclosed. The master processor is bootstrapped from flash device. The reset lines of the processor are asserted. The boot code for the processor is loaded from the flash device into the volatile memory device. The reset lines of the processor are de-asserted, wherein the processor will then boot from the boot code stored in the volatile memory device.

In accordance with another aspect of the present invention, a method and system for bootstrapping a processor from either a flash device or a volatile memory device is disclosed. The master processor is first bootstrapped. The master processor then determines whether a flash bootstrap procedure or a volatile memory device bootstrap procedure has been selected for the microprocessor. A command register in a logic device is set to configure logic units for the selected bootstrap procedure. If the flash bootstrap procedure was selected, the bootstrap procedure from the flash device associated with the processor is performed. However, if the volatile memory bootstrap procedure was selected, the reset lines of the second processor are asserted. The boot code for the processor in the flash device connected to the master processor is loaded into the volatile memory device of the second processor. The reset lines of the second processor are de-asserted, wherein the processor will then boot from the boot code stored in the volatile memory device.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a flowchart illustrating the steps that may be followed in accordance with one embodiment of the present inventive method or process.

DETAILED DESCRIPTION OF PREFERRED EMBODIMENTS OF THE INVENTION

A preferred embodiment of the present invention provides a system and method for performing bootstrap procedures from volatile memory devices, such as static random access memory (SRAM) or dual port random access memory (DPRAM). The present invention "tricks" processors into believing that they are being bootstrapped by flash devices, when in fact they are being bootstrapped by volatile memory devices.

Figure 1:
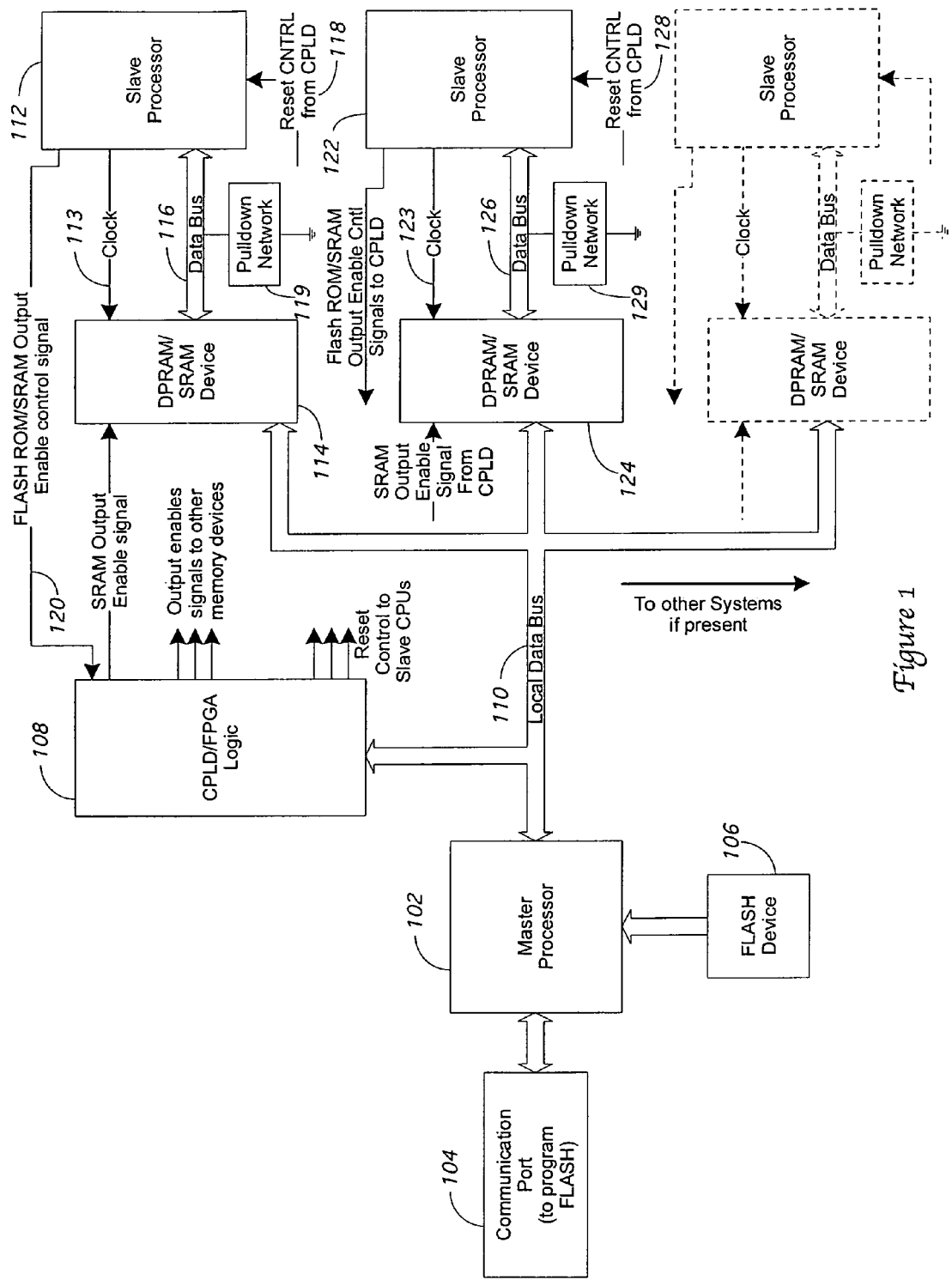
FIG. 1 provides a block diagram of a computer system of a preferred embodiment of the present invention.

A preferred embodiment of the present inventive apparatus and method is illustrated in FIG. 1, which illustrates a computer system 100. The computer system 100 is comprised of a master processing unit 102, a flash device 106, a programmable logic device 108, a local data bus 110, a plurality of slave processing units 112, 122, volatile memory devices 114, 124 and a plurality of data busses 116, 126. As illustrated by the dashed lines, any number of slave processing units and associated devices can be connected to the computer system 100 and the present invention is not limited to the two slave processing units illustrated in FIG. 1.

The first processing unit 102 is connected to the flash device(s) 106 and a communications port 104. While the description of the embodiments of the present invention makes reference to processors and processing units, it will be understood that the description pertains to processors, microprocessors, processing units and the like and the invention is not limited thereto. The first processing unit 102 is also connected to the local data bus 110, which is connected to the logic device 108 and the plurality of volatile memory devices 114, 124. The programmable logic device 108 is a programmable integrated circuit that allows the user of the circuit, using software control, to customize the logic functions the circuit will perform. In this case, the programmable logic device is controlled by the first processing unit 102 to provide output enable signals to the volatile memory devices and reset control lines to the processors 112 and 122. The programmable logic device also receives volatile/non-volatile output enable control signals 120 from each second processing unit 112, 122. The programmable logic device 108 can be a complex programmable logic device (CPLD), a field programmable gate array (FPGA), or the like. Each second processing unit 112, 122 is connected to its associated volatile memory device 114, 124 by the data busses 116 and 126, respectively. The volatile memory devices can be static random access memory devices, dual port random access memory devices, or the like. A pulldown network 119, 129 is connected between each data bus 116, 126 and ground. This resistor network insures that the data bus is at a zero state when the bus is in tristate mode. Thus, when the second processor reads the data bus at a zero state, it is a no-op command to the processor. This method is needed for synchronous volatile memory since the processor during power-up does not supply the clock 113, 123 for about 10 execution cycles that is needed to read data from synchronous memory. The no-op command is a 'filler' for this interval until the processor produces the clock 113, 123.

Figure 2:
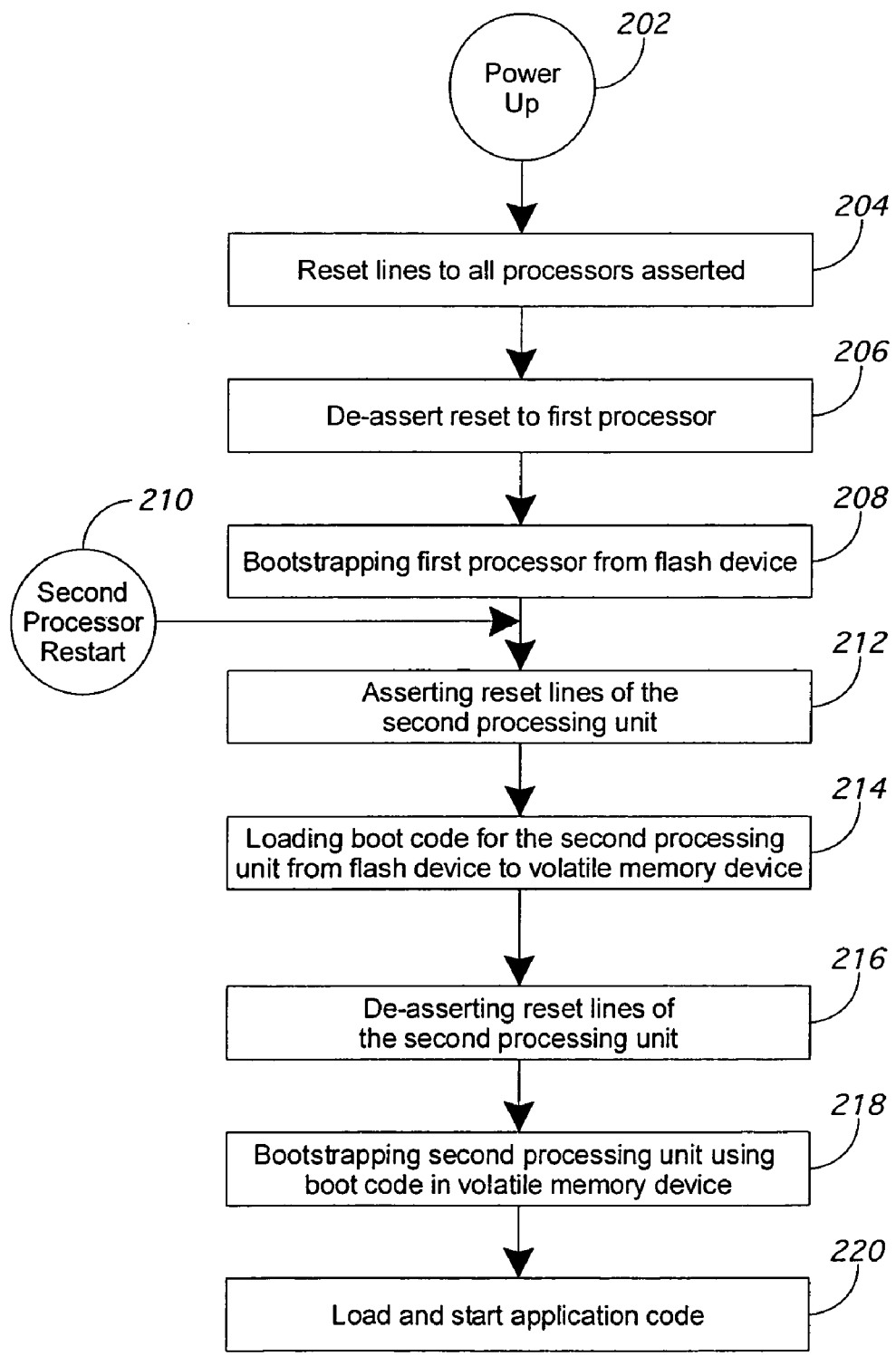
FIG. 2 is a flowchart illustrating the steps that may be followed in accordance with one embodiment of the present inventive method or process.

The operation of the computer system 100 will now be described with reference to FIG. 2. In order to boot the slave processing units 112 and 122 from the volatile memory devices 114 and 124, respectively, the programmable logic device 108 contains logic to correctly combine the second processing unit's memory interface signals and the hardware handshake signals of the master processor 102 to 'trick' the slave processing units 112, 122 into thinking that they are being bootstrapped using flash devices. First, the first processing unit 102 is bootstrapped in a known manner using the flash device 106. During system initialization 202 (and board reset release), the first processing unit commands the programmable logic device to generate and assert the reset lines 118, 128 of the slave processing units in step 204. The reset lines to all processors are asserted 204 after power up 202 automatically from the CPLD. Then, after a preset time, the first processor's reset line is automatically brought out of reset 206, from which it continues its bootstrapping sequence 208. The first processor can re-reset and restart 210 the bootstrapping sequence to the second, third, etc . . . processors, if for any reasons a processor fault occurs during execution or a newer bootstrap code is needed to replace the current code in the volatile memory. This can occur not only at power up. The first processing unit then commands the programmable logic device to generate and assert the reset lines 118, 128 of the slave processing units in step 212. The first processing unit 102 then loads the boot code for the slave processing units 112, 122 from the flash device to the volatile memory devices 114, 124 using the local bus 110 in step 214. The first processing unit 102 then commands the programmable logic device 108 to de-assert the reset lines 118, 128 of the second processing units 112, 122 in step 216. The second processing units 112, 122 then accept the boot code from the volatile memory device 114, 124, respectively, and perform their bootstrap procedure in step 218. This is followed by loading of application and starting of application code in step 220. This code can be loaded through shared volatile memory or through other communication mechanisms e.g. PCI as described.

This method and system can be used for multi-drop (parallel processing) systems that have multiple slave processing units performing similar functionality and executing the same boot code. The master processing unit's firmware provides identity to each slave processing unit by posting information through shared memory. One advantage of this system is that the bootstrap procedure can be changed by simply downloading the new procedure to the first processing unit 102 over the communication port 104, wherein the new procedure is stored in the flash device 106.

Slave processing units may, however, be designed only to boot asynchronously from flash devices. Accordingly, the slave processing unit will not supply a synchronous clock output during its initial addressing of the memory devices. Another synchronous clock issue is the inability to change the slave processing unit's internal phase lock loop (PLL) to a different operation frequency while using the volatile memory boot architecture. It is sometimes common for a processor to start at a low clock frequency and to change the PLL to a much higher operating frequency during the bootstrap sequence. When this occurs, the synchronous clock stops momentarily and then restarts again but is erratic until a determined settling time occurs. By using the correct sequence of No-Operation instructions, as mentioned previously, and instruction cache, these processing units can bootstrap from the synchronous SRAM devices where the SRAM clock is discontinuous through the bootstrap sequence.

Figure 3:
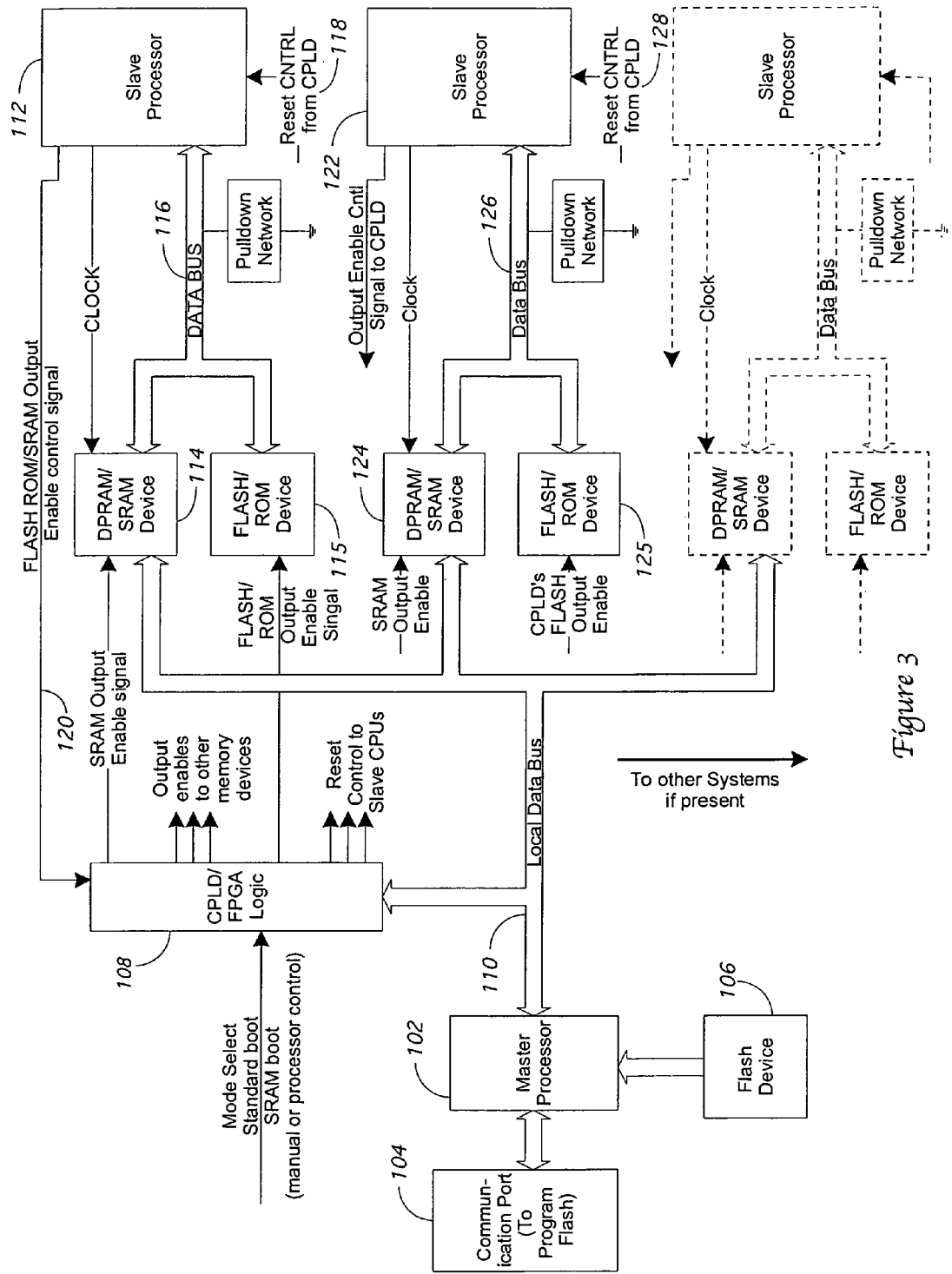
FIG. 3 provides a block diagram of a computer system of a preferred embodiment of the present invention.

FIG. 3 illustrates a computer system 300 according to another embodiment of the present invention in which each second processing unit can be selectively bootstrapped from either a flash device or a volatile memory device. FIG. 3 is similar to FIG. 1 except that each processing unit 112, 122 is connected to a separate flash device 115, 125 and the volatile memory devices 114, 124, respectively. In addition, the programmable logic device 108 outputs a flash output enable signal to each flash device 115, 125.

The operation of the computer system 300 illustrated in FIG. 3 will now be described with reference to FIG. 4. First, the first processing unit 102 is bootstrapped in a known manner using the flash device 106 in step 402. The first processing unit 102 then determines which bootstrap procedure has been selected for the slave processing units in step 404. The first processing unit 102 then sets a command register in the programmable logic device 108 so that the logic units are set for the appropriate procedure in step 406. Alternatively, the selected bootstrapping mode can be input into the programmable logic unit either manually or through processor control via a Mode Select line. If it is determined in step 408 that the flash procedure has been selected, the slave processing units are bootstrapped in a known manner using the boot code stored in the flash devices 115, 125 in step 410.

Alternatively, if it is determined in step 408 that the volatile memory procedure has been selected, the master processing unit commands the programmable logic device generate and assert the reset lines 118, 128 of the slave processing units in step 412. The first processing unit 102 then loads the boot code for the slave processing units 112, 122 from the flash device to the volatile memory devices 114, 124 using the local bus 110 in step 414. The first processing unit 102 then commands the programmable logic device 108 to de-assert the reset lines 118, 128 of the slave processing units 112, 122 in step 416. The slave processing units 112, 122 then accept the boot code from the volatile memory device 114, 124, respectively, and perform their bootstrap procedure in step 418. This is followed by loading of application and starting of application code. This code can be loaded through shared volatile memory or through other communication mechanisms e.g. PCI as described in step 420. The application load and startup details are out of the scope of this invention.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for using a first processor to bootstrap a second processor from a synchronous volatile memory device connected to the second processor, comprising the steps of:
   bootstrapping the first processor from flash device;
   asserting reset lines of the second processor;
   loading boot code for the second processor from the flash device into the volatile memory device;
   de-asserting the reset lines of the second processor,
   preventing the second processor from attempting to read the volatile memory device while a clock signal from the second processor stabilizes after reset; and
   providing the clock signal from the second processor to the synchronous volatile memory device while the second processor performs the bootstrap procedure using the boot code stored in the synchronous volatile memory device.

2. The method according to claim 1, wherein a complex programmable logic device generates the reset lines of the second processor.

3. The method according to claim 2, wherein the reset lines are controlled by the first processor and handled by the complex programmable logic device.

4. The method according to claim 1, wherein a plurality of second processors are bootstrapped by loading the boot code for the plurality of second processors into a plurality of volatile memory devices, wherein each second processor is connected to a different volatile memory device.

5. The method according to claim 4, wherein the first processor provides identity to each of the plurality of second processors by posting information through the volatile memory devices containing the boot code.

6. The method according to claim 1, wherein the volatile memory device is dual port random access memory.

7. The method according to claim 1, wherein the volatile memory device is a synchronous dual port static random access memory.

8. The method according to claim 1, wherein the synchronous static random access memory has a discontinuous clock throughout the bootstrapping procedure.

9. A system for bootstrapping a plurality of slave processors from a plurality of volatile memory devices, comprising:
   a master processor with an associated flash device;
   a logic device for generating reset lines of the slave processors and deasserting the reset lines based on control signals from the master processor;
   the volatile memory devices storing boot code for the slave processors loaded from the flash device after the master processor has been bootstrapped;
   the slave processors each being connected to a separate volatile memory device, wherein when the reset lines of the slave processors are de-asserted, the slave processors bootstrap from the boot code stored in the volatile memory devices;
   wherein the master processor provides identity to each of the slave processors by posting information through the volatile memory devices.

10. The system according to claim 9, wherein the logic device is a complex programmable logic device.

11. The system according to claim 10, wherein the logic device is a field programmable gate array.

12. The system according to claim 9, wherein the volatile memory devices are static random access memories.

13. The system according to claim 9, wherein the volatile memory devices are dual port random access memories.

14. The system according to claim 9, wherein the volatile memory device is a synchronous static random access memory.

15. The system according to claim 9, wherein the volatile memory devices have a discontinuous clock through out the bootstrapping procedure.

16. The system according to claim 9, further comprising:
a plurality of slave flash devices each connected to one of the slave processors, the slave flash devices having boot code for the slave processors, wherein the master processor determines whether to bootstrap the slave processors using the boot code in the slave flash devices or the boot code in the volatile memory devices.

17. The system according to claim 16, wherein the master processor sets a command register in the logic device to configure logic units for the selected bootstrap procedure.

18. A method for bootstrapping a second processor from either a flash device or a synchronous volatile memory device, comprising the steps of:
bootstrapping a master processor;
determining whether a flash bootstrap procedure or a volatile memory device bootstrap procedure has been selected for the second processor;
setting a command register in a logic device to configure logic units for the selected bootstrap procedure;
if the flash bootstrap procedure was selected:
performing bootstrap procedure from the flash device associated with the second processor;
if the volatile memory bootstrap procedure was selected:
asserting reset lines of the second processor;
loading boot code for the second processor from a flash device associated with the master processor into the volatile memory device;
de-asserting the reset lines of the second processor;
allowing a clock signal from the second processor to stabilize before providing the clock signal to the synchronous volatile memory device; and
bootstrapping the second processor from the boot code stored in the volatile memory device.

19. The method according to claim 18, wherein a complex programmable logic device generates the reset lines of the second processor.

20. The method according to claim 19, wherein the reset lines are controlled by the master processor.

21. The method according to claim 18, wherein a plurality of second processors are bootstrapped by loading the boot code for the plurality of second processors into a plurality of volatile memory devices, wherein each second processor is connected to a different volatile memory device.

22. The method according to claim 21, wherein the master processor provides identity to each of the plurality of second processors by posting information through the volatile memory devices.

23. The method according to claim 18, wherein the volatile memory device is dual port random access memory.

24. The method according to claim 18, wherein the synchronous static random access memory has a discontinuous clock through out the bootstrapping procedure.

25. A mechanism for bootstrapping a processor from a volatile memory device connected to the processor, comprising the steps of:
means for asserting reset lines of the processor;
means for loading boot code for the processor from a flash device into the volatile memory device; and
means for de-asserting the reset lines of the processor,
means for preventing the processor from reading a synchronous volatile memory device while a clock signal from the processor stabilizes after reset;
wherein the processor performs the bootstrap procedure using the boot code stored in the volatile memory device while the processor provides the clock signal to the synchronous volatile memory device.

26. The mechanism of claim 25, wherein a complex programmable logic device generates the reset lines of the processor.

27. The mechanism of claim 25, wherein at least one additional processor is bootstrapped by loading the boot code for the additional processors into additional volatile memory devices, wherein each additional processor is connected to a different additional volatile memory device.

28. The mechanism of claim 27, wherein identity to each of the processors is provided by posting information through the volatile memory devices.

29. The mechanism of claim 25, wherein the volatile memory device is dual port random access memory.

30. The mechanism of claim 29, wherein the memory control signals of the dual port static random access memory has a discontinuous clock through out the bootstrapping procedure.

31. A computing system comprising:
a nonvolatile memory device containing a master bootstrap process;
a synchronous static random access memory containing a slave bootstrap process;
a master processor in communication with the nonvolatile memory device, the master processor booting with the master bootstrap process, the master processor storing the slave bootstrap process on the synchronous static random access memory after the master processor has booted;
a slave processor in communication with the synchronous static random access memory, the slave processor providing a clock signal to the synchronous static random access memory while booting with the slave bootstrap process stored on the synchronous static random access memory.

32. A computing system comprising:
a nonvolatile memory device containing a master bootstrap process;
a synchronous random access memory containing a slave bootstrap process;
a master processor in communication with the nonvolatile memory device, the master processor booting with the master bootstrap process;
a slave processor providing a clock signal to the synchronous random access memory;
a data bus providing data communication between the synchronous random access memory and the slave processor; and
a pulldown resister network on the data bus ensuring that the slave processor receives no-op instructions over the data bus during periods of clock instability.

33. A computing system comprising:
a first volatile memory device containing a first identity;
a second volatile memory device containing a second identity;
a master processor in communication with the volatile memory devices, the master processor storing the first identity on the first volatile memory device, and the second identity on the second volatile memory device;

a first slave processor in communication with the first volatile memory device, the first slave processor obtaining the first identity from the first volatile memory; and a second slave processor in communication with the second volatile memory device, the second slave processor obtaining the second identity from the second volatile memory.

34. The computing system of claim 33, wherein the master processor stores on each volatile memory device a slave bootstrap process, and wherein the slave processors each boot with the slave bootstrap process received from the volatile memory devices.

35. A method for bootstrapping a processor from a synchronous memory device connected to the processor, comprising the steps of:

loading the synchronous memory device with a boot code;

resetting the processor after the boot code is loaded in the synchronous memory device;

submitting no-op commands to the processor until the processor provides a reliable clock signal;

supplying the reliable clock signal to the synchronous memory device; and loading the boot code from the synchronous memory device to the processor.

36. The method of claim 35, wherein the no-op command is created by a resister network on a data bus.

37. The method of claim 36, wherein the resister network is a pulldown network that pulls the data bus to a zero state.

38. The method of claim 35, wherein the synchronous memory device has a discontinuous clock during the loading of the boot code to the processor causing a period of clock instability.

39. The method of claim 38, wherein an instruction cache of the processor is used in conjunction with the no-op commands during the period of clock instability.

40. A computing system comprising:

a nonvolatile memory device containing a slave bootstrap process;

a synchronous volatile random access memory on which the slave bootstrap process is transferred after power up;

a data bus;

a master processor providing a control signal;

a slave processor providing a memory control signal, receiving a reset control signal, and receiving data from the synchronous volatile random access memory over the data bus, the slave processor providing a clock signal to the synchronous volatile random access memory;

a pulldown resistor network on the data bus ensuring that the slave processor receives no-op instructions over the data bus during periods of clock instability; and a programmable logic device acting in response to the control signal from the master processor and the memory control signal from the slave processor, the programmable logic device providing a reset control signal to the slave processor and a memory control signal to the synchronous volatile random access memory.

* * * * *